(12) United States Patent
Wada

(10) Patent No.: US 6,930,961 B2
(45) Date of Patent: Aug. 16, 2005

(54) GROOVING APPARATUS AND GROOVING METHOD

(75) Inventor: Yasumitsu Wada, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 504 days.

(21) Appl. No.: 10/108,702

(22) Filed: Mar. 29, 2002

(65) Prior Publication Data

US 2002/0172130 A1 Nov. 21, 2002

(30) Foreign Application Priority Data

Mar. 30, 2001 (JP) .................................. P2001-102214

(51) Int. Cl.⁷ .............................................. G11B 7/00
(52) U.S. Cl. .................................. 369/44.13; 369/101
(58) Field of Search .......................... 369/44.13, 101, 369/121, 47.36, 47.38, 47.46, 53.25, 53.29, 53.3; 250/126, 310

(56) References Cited

U.S. PATENT DOCUMENTS 3,943,302 A * 3/1976 Johnston, Jr. ................. 369/17
4,041,532 A * 8/1977 Plows et al. .............. 369/13.01
4,760,567 A * 7/1988 Crewe ......................... 369/101

* cited by examiner

Primary Examiner—Paul W. Huber
(74) Attorney, Agent, or Firm—Sughrue Mion, PLLC

(57) ABSTRACT

Disclosed is a grooving apparatus which can carry information on an information track at high recording density when carrying the information on the information track through a change in shape of a groove and which also can improve the signal-to-noise ratio of the information under reproduction. A grooving apparatus for forming a groove to function as an information track in an optical disk comprises an electron beam generator which emits an electron beam, an objective lens which focuses the emitted electron beam on the optical disk and which focuses the electron beam on a smaller range than the size of the groove, and an X-direction deflector and a Y-direction deflector which controls the electron beam so that the electron beam is focused in position on the optical disk, thereby forming the groove in the optical disk.

12 Claims, 14 Drawing Sheets

GROOVING APPARATUS AND GROOVING METHOD

BACKGROUND OF THE INVENTION

1. Field of the Invention

The present invention relates to the technical field of a grooving apparatus and a grooving method and more particularly to the technical field of a grooving apparatus and a grooving method for forming a groove which is to be formed in an optical disk so as to function as an information track of the optical disk or the like.

2. Description of the Related Art

Recently, the DVD-R (Digital Versatile Disc-Recordable) or DVD-RW (Digital Versatile Disc-Re-Recordable) or the like has been coming into general use as a high-recording-density and recordable optical disk. In each of these recordable optical disks, two walls (wall surfaces) of a groove, which is formed in the optical disk so as to function as an information track on which information is recorded, have varying shapes so as to record information such as address information indicative of a record location at which information is recorded on the optical disk. More specifically, changes in the shapes of the walls are that the walls are waved in the radial direction of the optical disk, and thus, a frequency is modulated on the waved walls in accordance with information to be recorded so that the information is carried on the information track.

Recently, the GBR (Groove Baseband Recording) method has been designed as a method for carrying necessary information on the information track by using varying shapes of the walls of the groove as described above. The GBR method is described in detail by, for example, S. Kobayashi et al. in "GBR (Groove Baseband Recording) for an optical disc ROM", Tech. digest of ODS2000, and so forth.

However, the above-mentioned conventional GBR method has the following problem. The GBR method is configured to correspondingly irradiate the walls of the groove with two laser beams and control the positions irradiated with the two laser beams in accordance with a shape signal indicative of a change in the shape of each wall, and therefore, it is impossible in principle to form the walls, each of which exhibits a shape change whose cycle is shorter than a length which is obtained from a length of a track pitch by dividing a wavelength of each laser beam by a numerical aperture of a condenser objective lens.

More specifically, the increase in an information recording density of the above-mentioned GBR method requires the reduction in the cycle of the change in the shape of each wall of the groove, but the minimum value of the track pitch that can be formed as the information track cannot be under about 0.3 μm even through the use of the GBR method using the laser beams capable of realizing the highest recording density under the current circumstances.

To form the groove while carrying information on the walls of the groove by using the GBR method, it is desirable for improvement in signal-to-noise ratio of the information under reproduction that the walls be formed as nearly perpendicular to an information recording surface of the optical disk as possible.

However, the above-mentioned conventional GBR method using the laser beams has difficulty in forming the walls perpendicular to the information recording surface, so that the walls are formed at an angle to the information recording surface. This results from exposure characteristics of a photoresist which is exposed to the beams of laser light when the walls are being formed. Therefore, the GBR method has another problem: the walls each having a gentle slope make it difficult to obtain an excellent reproduced information signal having a high signal-to-noise ratio because the GBR method is basically adapted to detect a change in the position of each wall in the radial direction of the optical disk as described above.

SUMMARY OF THE INVENTION

The invention is designed to overcome the foregoing problems. It is an object of the present invention to provide a grooving apparatus and a grooving method which can carry information on an information track at high recording density when carrying the information on the information track through a change in shape of a groove and which also can improve the signal-to-noise ratio of the information under reproduction.

The above object of the present invention can be achieved by a grooving apparatus of the present invention for forming a groove to function as an information track in an information recording medium. The apparatus is provided with: an emitting device which emits an electron beam; a focusing device which focuses the emitted electron beam on a fixed range smaller than the size of the groove on the information recording medium; and a controlling device which controls the electron beam so that the electron beam is focused in position on the information recording medium to form the groove in the information recording medium.

According to the present invention, the focusing device focuses the electron beam on the information recording medium to form the beam spot, and the controlling device controls the beam spot so that the beam spot is focused in position on the information recording medium, thereby forming the groove in the information recording medium. Therefore, the grooving apparatus can form the groove at higher density with higher precision, as compared to a conventional apparatus which uses a laser beam to form a groove. As a result, information such as address information can be carried at higher recording density on the information track through a change in the shape of the groove, and moreover, the signal-to-noise ratio of the information under reproduction can be improved.

In one aspect of the present invention, the focusing device uses one emitted electron beam to form one beam spot of a fixed size on the information recording medium in a smaller range than the size of the groove, and the controlling device includes a moving device which moves the beam spot at a fixed velocity of movement of the beam spot relative to the information recording medium in accordance with two shape signals indicative of the respective shapes of two walls of the groove so as to scan the beam spot on the information recording medium in an area to be formed into the groove.

According to this aspect, the focusing device uses one electron beam to form the beam spot, and the moving device moves the beam spot at a fixed velocity of movement of the beam spot relative to the information recording medium in accordance with two shape signals so as to scan the beam spot on the information recording medium in an area to be formed into the groove. Therefore, the grooving apparatus can form the groove at still higher density with higher precision.

In another aspect of the present invention, the focusing device uses one emitted electron beam to form one beam spot of a fixed size on the information recording medium in a smaller range than the size of the groove, and the controlling device includes a moving device which moves the beam spot at a variable velocity of movement of the beam spot relative to the information recording medium at a fixed frequency of movement of the beam spot on the information recording medium in accordance with two shape signals indicative of the respective shapes of two walls of the groove so as to scan the beam spot on the information recording medium in an area to be formed into the groove.

According to this aspect the focusing device uses one electron beam to form the beam spot, and the moving device moves the beam spot at a variable velocity of movement of the beam spot relative to the information recording medium at a fixed frequency of movement of the beam spot on the information recording medium in accordance with two shape signals so as to scan the beam spot on the information recording medium in an area to be formed into the groove. Therefore, the grooving apparatus can form the groove at still higher density with higher precision.

In further aspect of the present invention, the moving device moves the beam spot so that a scanning locus of one immediately preceding scan of the beam spot overlaps a scanning locus of the current scan of the beam spot in the direction of the groove.

According to this aspect, the moving device moves the beam spot so that a scanning locus of one immediately preceding scan of the beam spot overlaps a scanning locus of the current scan of the beam spot in the direction of the groove. Therefore, the grooving apparatus can more smoothly form the surfaces of the walls of the groove.

In further aspect of the present invention, the focusing device uses one emitted electron beam to form one beam spot on the information recording medium in a smaller range than the size of the groove, and the controlling device includes a moving device which controls the beam spot so that the beam spot moves on the information recording medium in an area to be formed into the groove, while controlling the shape of the beam spot in accordance with two shape signals indicative of the respective shapes of two walls of the groove.

Accordingly, the focusing device uses one electron beam to form the beam spot, and the moving device controls the beam spot so that the beam spot moves on the information recording medium in an area to be formed into the groove, while controlling the shape of the beam spot in accordance two shape signals. Therefore, the grooving apparatus having a simple configuration can form the groove at higher density with higher precision, as compared to a conventional apparatus which uses a laser beam to form a groove.

In further aspect of the present invention, the shape signals change according to information to be carried on the groove through changes in the shapes of the walls.

According to this aspect, the shape signals change according to information to be carried on the groove through changes in the shapes of the walls. Therefore, the grooving apparatus can form the groove at higher density with higher precision, while carrying information on the groove.

The above object of the present invention can be achieved by a grooving method of the present invention for forming a groove to function as an information track in an information recording medium. The method is provided with: an emitting process of emitting an electron beam; a focusing process of focusing the emitted electron beam on a fixed range smaller than the size of the groove on the information recording medium; and a controlling process of controlling the electron beam so that the electron beam is focused in position on the information recording medium to form the groove in the information recording medium.

According to the present invention, the focusing process focuses the electron beam on the information recording medium to form the beam spot, and the controlling process controls the beam spot so that the beam spot is focused in position on the information recording medium, thereby forming the groove in the information recording medium. Therefore, the grooving method can form the groove at higher density with higher precision, as compared to a conventional method which uses a laser beam to form a groove. As a result, information such as address information can be carried at higher recording density on the information track through a change in the shape of the groove, and moreover, the signal-to-noise ratio of the information under reproduction can be improved.

In one aspect of the present invention, the focusing process uses one emitted electron beam to form one beam spot of a fixed size on the information recording medium in a smaller range than the size of the groove, and the controlling process includes a moving process of moving the beam spot at a fixed velocity of movement of the beam spot relative to the information recording medium in accordance with two shape signals indicative of the respective shapes of two walls of the groove so as to scan the beam spot on the information recording medium in an area to be formed into the groove.

According to this aspect, the focusing process uses one electron beam to form the beam spot, and the moving process moves the beam spot at a fixed velocity of movement of the beam spot relative to the information recording medium in accordance with two shape signals so as to scan the beam spot on the information recording medium in an area to be formed into the groove. Therefore, the grooving method can form the groove at still higher density with higher precision.

In another aspect of the present invention, the focusing process uses one emitted electron beam to form one beam spot of a fixed size on the information recording medium in a smaller range than the size of the groove, and the controlling process includes a moving process of moving the beam spot at a variable velocity of movement of the beam spot relative to the information recording medium at a fixed frequency of movement of the beam spot on the information recording medium in accordance with two shape signals indicative of the respective shapes of two walls of the groove so as to scan the beam spot on the information recording medium in an area to be formed into the groove.

According to this aspect, the focusing process uses one electron beam to form the beam spot, and the moving process moves the beam spot at a variable velocity of movement of the beam spot relative to the information recording medium at a fixed frequency of movement of the beam spot on the information recording medium in accordance with two shape signals so as to scan the beam spot on the information recording medium in an area to be formed into the groove. Therefore, the grooving method can form the groove at still higher density with higher precision.

In further aspect of the present invention, the moving process moves the beam spot so that a scanning locus of one immediately preceding scan of the beam spot overlaps a scanning locus of the current scan of the beam spot in the direction of the groove.

According to this aspect, the moving process moves the beam spot so that a scanning locus of one immediately preceding scan of the beam spot overlaps a scanning locus of the current scan of the beam spot in the direction of the groove. Therefore, the grooving method can more smoothly form the surfaces of the walls of the groove.

In further aspect of the present invention, the focusing process uses one emitted electron beam to form one beam spot on the information recording medium in a smaller range than the size of the groove, and the controlling process includes a moving process of controlling the beam spot so that the beam spot moves on the information recording medium in an area to be formed into the groove, while controlling the shape of the beam spot in accordance with two shape signals indicative of the respective shapes of two walls of the groove.

According to this aspect, the focusing process uses one electron beam to form the beam spot, and the moving process controls the beam spot so that the beam spot moves on the information recording medium in an area to be formed into the groove, while controlling the shape of the beam spot in accordance two shape signals. Therefore, the grooving method having a simple configuration can form the groove at higher density with higher precision, as compared to a conventional method which uses a laser beam to form a groove.

In further aspect of the present invention, the shape signals change according to information to be carried on the groove through changes in the shapes of the walls.

According to this aspect, the shape signals change according to information to be carried on the groove through changes in the shapes of the walls. Therefore, the grooving method can form the groove at higher density with higher precision, while carrying information on the groove.

DETAILED DESCRIPTION OF THE PREFERRED EMBODIMENTS

Preferred embodiments of the present invention will be described below with reference to the drawings.

Each of the embodiments to be described below is carried out in the case where the present invention is applied to change the shapes of two walls of one groove which is formed in a recordable optical disk so as to function as an information track, that is, the respective positions of an outer peripheral wall and an inner peripheral wall in the radial direction of the optical disk, according to information to be carried through a change in the shape of each wall, e.g., information such as address information indicative of a record location of record information to be recorded on the optical disk.

(I) The principle of the present invention

Firstly, the description is given with regard to the principle of the present invention with reference to FIGS. 1A to 8, prior to the description of the specific embodiments.

Figure 1A:
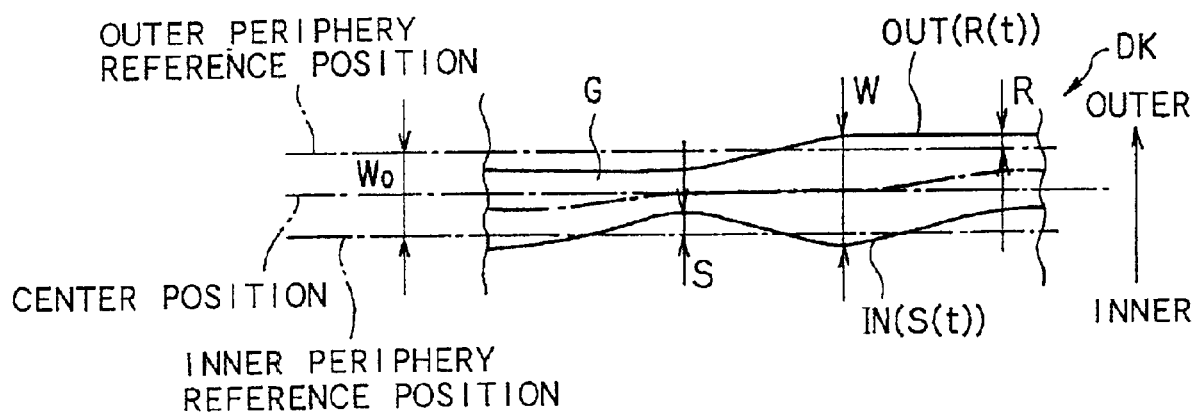
FIGS. 1A and 1B are illustrations explaining the principle of the present invention.

In the present invention, the respective positions of two walls in the radial direction of the optical disk are changed according to information to be carried through changes in the shapes of the two walls of one groove, as described above. In this case, the shape of a groove G whose walls change in their positions in the radial direction changes in the following manner: as shown in FIG. 1A, an outer peripheral wall OUT and an inner peripheral wall IN of an optical disk DK change independently of each other according to a wall position control signal R(t) indicative of the shape of the wall OUT and a wall position control signal S(t) indicative of the shape of the wall IN, respectively, and this causes a change in a width W of the groove G.

In the present invention, a width control signal W(t) indicative of the change in the width W of the groove G in itself and a position control signal D(t) indicative of the position of the groove G in the radial direction of the optical disk DK are generated from the above-mentioned two wall position control signals R(t) and S(t), and then, the optical disk DK is irradiated with an electron beam under control of these signals W(t) and D(t) so as to form the groove G in the optical disk DK.

Figure 1B:
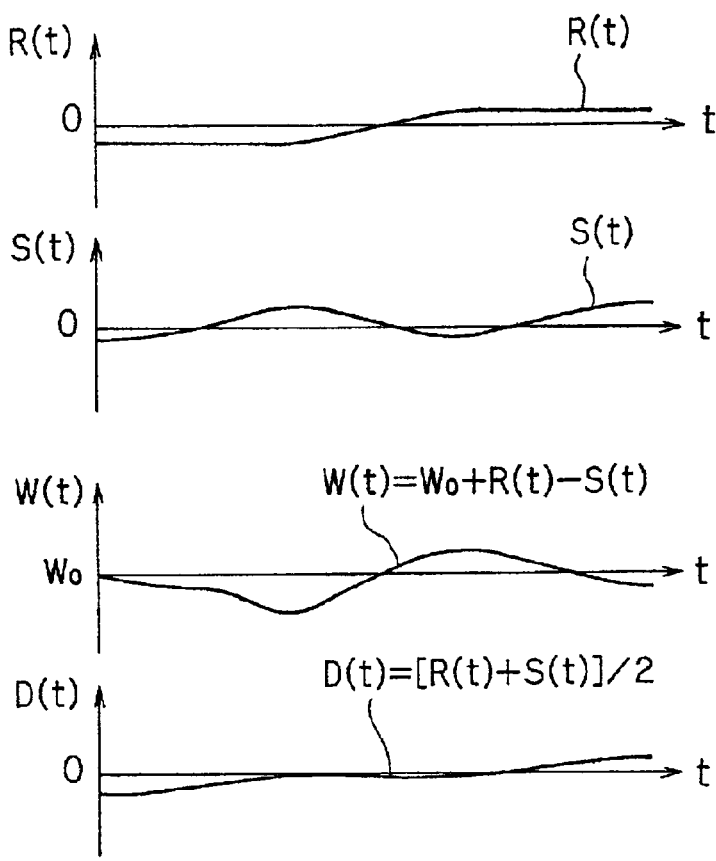

As shown in FIG. 1B, the width control signal W(t) and the position control signal D(t) can be expressed as the following equations (1) and (2), respectively, using the original wall position control signals R(t) and S(t):

$$W(t)=W_0+R(t)-S(t) \qquad (1)$$

$$D(t)=\{R(t)+S(t)\}/2 \qquad (2)$$

where $W_0$ denotes an average width of the groove G as shown in FIG. 1A. In the above equations (1) and (2), it can be seen from FIG. 1A that the amount R of change in position of the wall OUT (i.e., the amount of change in position of the wall OUT relative to the reference position) is assumed to take on any positive value when the wall OUT is located in the direction of the outer periphery of the optical disk DK relative to the reference position, whereas the amount S of change in position of the wall IN (i.e., the amount of change in position of the wall IN relative to the reference position, similarly to the amount R) is assumed to take on any positive value when the wall IN is located in the direction of the outer periphery of the optical disk DK relative to the reference position.

In the present invention, the optical disk DK is irradiated with the electron beam under control of the width control signal W(t) and the position control signal D(t) which are obtained in the above-described manner, so as to form the groove G in the optical disk DK (more precisely, on a resist with which an original master of the optical disk DK is coated).

In the present invention, the groove G is formed by any one of two methods, that is, a method of forming the groove G by scanning the position to be irradiated with the electron beam without changing the shape of a beam spot which appears on the optical disk DK through irradiation with the electron beam (i.e., a first embodiment to be described below), and a method of forming the groove G by shifting the position to be irradiated with the electron beam while changing the shape in itself of the beam spot (i.e., a second embodiment to be described below).

In turn, the respective principles of the methods will be described.

(A) The principle of the first method

Firstly, the description is given with regard to the principle of the first method with reference to FIGS. 2A to 7.

As described above, the first method is the method of forming the groove G by scanning the beam spot on the optical disk DK in an area to be formed into the groove G without changing the shape in itself of the beam spot.

Figure 2A:
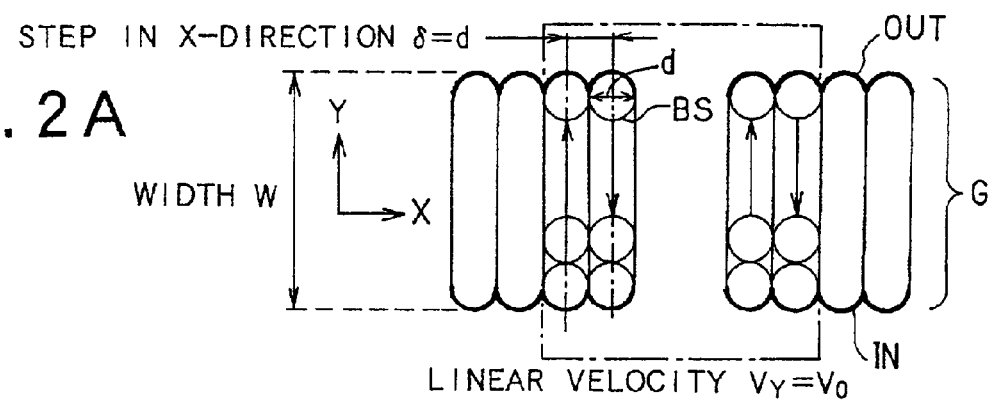
FIGS. 2A to 2C are illustrations (I) explaining the principle of a first method.
Figure 2B:
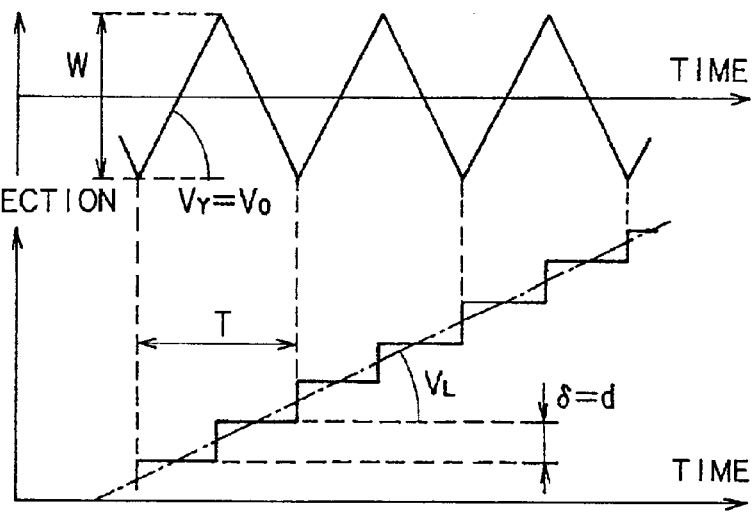
Figure 2C:
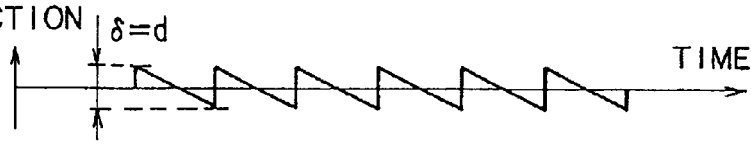

To facilitate the understanding, the description is first given with reference to FIGS. 2A to 2C with regard to how to scan the beam spot, provided that the positions of the walls of the groove G are fixed in the radial direction of the optical disk DK and that an overlapping area is not provided for one scan each. FIG. 2A shows how the beam spot moves to form the groove G in the optical disk DK, and FIGS. 2B and 2C show a change in the position of the beam spot on the optical disk DK, which occurs during the formation of the groove G.

As shown in FIG. 2A, the dose of electrons by the irradiation of the optical disk DK with the electron beam must be always constant in order to form the groove G having a uniform width W through the scanning of a beam spot BS under the assumption that the optical disk DK does not rotate, and therefore it is necessary to scan the beam spot BS at a constant linear velocity $V_Y = V_0$ in the direction (i.e., the radial direction of the optical disk DK, which is hereinafter referred to as the Y-direction) perpendicular to the direction in which the groove G is to be formed (i.e., the circumferential direction of the optical disk DK, which is hereinafter referred to as the X-direction). In addition, it is necessary to move the beam spot BS in the X-direction by a diameter d of the beam spot BS after the end of the scanning by the width W. Further, after that, it is necessary to repeatedly scan the beam spot BS at the same linear velocity $V_0$ in the direction opposite to the direction of the immediately preceding scanning.

Next, the description is given with reference to FIG. 2B with regard to a change in the position of the beam spot BS on the optical disk DK with respect to time, which is caused by the movement of the beam spot BS shown in FIG. 2A (under the assumption that the optical disk DK does not rotate). A change in position in the Y-direction with respect to time (hereinafter, the change in position with respect to time is appropriately referred to as a change in position) assumes a triangular waveform due to the above-mentioned movement of the beam spot BS in the Y-direction, as shown in an upper graph of FIG. 2B. The amplitude of the wave is fixed at the value W, and the slope thereof is fixed at the linear velocity $V_0$.

A change in position in the X-direction which does not contain a component of rotation of the optical disk DK (i.e., the above-mentioned movement of the beam spot BS by the diameter d of the beam spot BS) is a step-wise change in the X-direction by the diameter d of the beam spot BS in itself at the timing of curving of the upper graph of FIG. 2B, as shown in a lower graph of FIG. 2B. An average linear component (shown by a chain line in FIG. 2B) of the step-wise change in position in the X-direction indicates a linear velocity $V_L$ in itself of rotation of the optical disk DK.

Accordingly, the change in the position of the beam spot BS on the optical disk DK, after allowing for the component of rotation of the optical disk DK, is as follows: the change in position in the X-direction is a position change having the ramp waveform which is obtained by subtracting the component of rotation of the optical disk DK from the lower graph of FIG. 2B, as shown in FIG. 2C, whereas the change in position in the Y-direction is the same as the change in position shown in the upper graph of FIG. 2B.

Parameters required for showing the position changes shown in FIGS. 2A to 2C are expressed as the following equations (3) to (6) using the above-defined reference characters:

$$W = V_Y \frac{T}{2} = V_0 \frac{T}{2} \quad (3)$$

$$2\delta = 2d = V_L T \quad (4)$$

$$f = \frac{1}{T} = \frac{V_0}{2W} \quad (5)$$

$$V_L = \frac{2d}{T} = \frac{V_0 d}{W} \quad (6)$$

where T denotes a cycle of the triangular wave shown in the upper graph of FIG. 2B, and f denotes a frequency of the triangular wave.

Figure 3A:
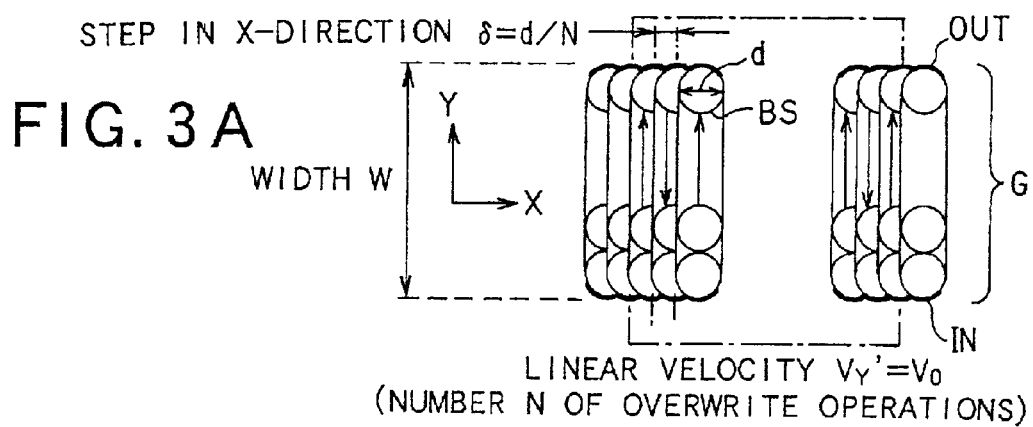
FIGS. 3A to 3C are illustrations (II) explaining the principle of the first method.
Figure 3B:
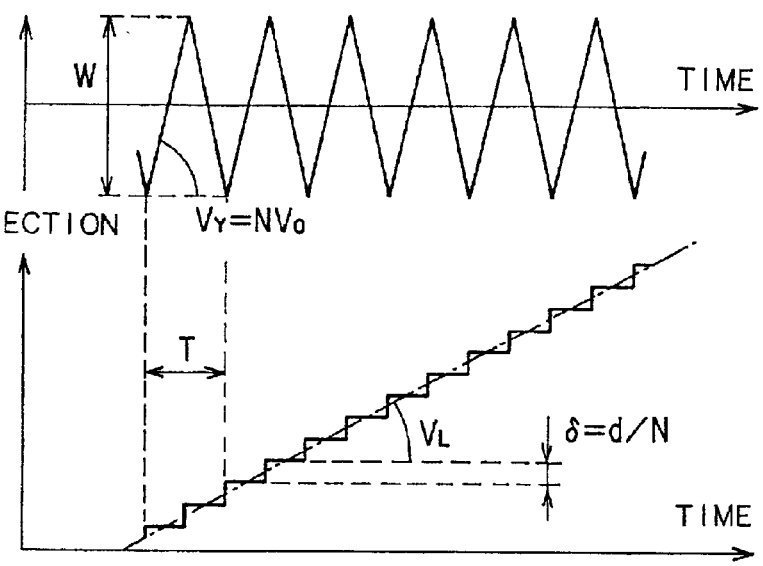
Figure 3C:
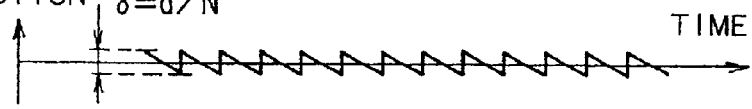

Next, the description is given with reference to FIGS. 3A to 3C with regard to how to move the beam spot, provided that the positions of the walls of the groove G are fixed in the radial direction of the optical disk DK and that an overlapping area is provided for one scan each. FIG. 3A shows how the beam spot moves to form the groove G in the optical disk DK, and FIGS. 3B and 3C show a change in the position of the beam spot on the optical disk DK, which occurs during the formation of the groove G.

In the above-mentioned example shown in FIGS. 2A to 2C, an overlapping area is not provided for one scan each, and therefore, each of the walls OUT and IN of the groove G formed as shown in FIG. 2A has a shape formed of a series of arcs of circles each corresponding to the shape of the beam spot BS, so that this causes changes in the shapes of the walls OUT and IN and thus leads to a drop in the signal-to-noise ratio of recorded information under reproduction. In an example shown in FIGS. 3A to 3C, the number of overwrite operations per unit length in the X-direction is therefore set to N (in other words, N scans take place per unit length in the X-direction) in order to form the groove G having the smoothest possible walls OUT and IN.

More specifically, as shown in FIG. 3A, the above-mentioned dose of electrons must be always fixed at the same value as the value of the dose of electrons of the example shown in FIG. 2A in order to form the groove G having a uniform width W through the scanning of the beam spot BS under the assumption that the optical disk DK does not rotate as in the case of the example shown in FIG. 2A, and therefore it is necessary to repeat the following scanning: the scanning of the beam spot BS at a constant linear velocity $V_{Y'}=NV_0$ in the Y-direction; and the scanning of the beam spot BS at the same linear velocity $V_{Y'}$ in the direction opposite to the direction of the immediately preceding scanning after moving the beam spot BS in the X-direction by the diameter d divided by the number N of overwrite operations after the end of the scanning by the width W.

As in the case of the example shown in FIG. 2B, the description is then given with reference to FIG. 3B with regard to a change in the position of the beam spot BS on the optical disk DK with respect to time, which is caused by the movement of the beam spot BS shown in FIG. 3A (under the assumption that the optical disk DK does not rotate). A change in position in the Y-direction assumes a triangular waveform due to the above-mentioned movement of the beam spot BS in the Y-direction, as shown in an upper graph of FIG. 3B. The amplitude of the wave is fixed at the value W, and the slope thereof is fixed at the linear velocity $NV_0$.

A change in position in the X-direction which does not contain a component of rotation of the optical disk DK is a step-wise change in the X-direction by the diameter d of the beam spot BS in itself divided by the number N of overwrite operations at the timing of curving of the upper graph of FIG. 3B, as shown in a lower graph of FIG. 3B. An average linear component (shown by a chain line in FIG. 3B) of the step-wise change in position in the X-direction indicates a linear velocity $V_L$ in itself of rotation of the optical disk DK.

Accordingly, the change in the position of the beam spot BS on the optical disk DK, after allowing for the component of rotation of the optical disk DK, is as follows: the change in position in the X-direction is a position change having the ramp waveform which is obtained by subtracting the component of rotation of the optical disk DK from the lower graph of FIG. 3B, as shown in FIG. 3C, whereas the change in position in the Y-direction is the same as the change in position shown in the upper graph of FIG. 3B.

Parameters required for showing the position changes shown in FIGS. 3A to 3C are expressed as the following equations (7) to (10) using the above-defined reference characters:

$$W = V_{Y'}\frac{T}{2} = NV_0\frac{T}{2} \quad (7)$$

$$2\delta = \frac{2d}{N} = V_L T \quad (8)$$

$$f = \frac{1}{T} = \frac{NV_0}{2W} \quad (9)$$

$$V_L = \frac{2d}{NT} = \frac{V_0 d}{W} \quad (10)$$

where T denotes a cycle of the triangular wave shown in the upper graph of FIG. 3B, and f denotes a frequency of the triangular wave.

In other words, it can be safely said that the above equations (3) to (6) and equations (7) to (10) are the conditions concerning the movement of the beam spot BS for keeping the dose of electrons constant in the above-described examples.

Next, the description is given with reference to FIGS. 4 to 7 with regard to how each of the following embodiments changes the positions of the walls OUT and IN in the radial direction according to information to be carried on the walls OUT and IN.

Incidentally, the following description is given with regard to the case where a scanning locus of one scan of the beam spot BS overlaps that of another scan as needed in order to improve smoothness of the walls OUT and IN.

Firstly, the number $N=d/\delta$ of overwrite operations is substituted into the above equations (9) and (10) so as to obtain the following equations (11) and (12).

$$f\delta = \frac{V_0 d}{2W} \quad (11)$$

$$V_L = \frac{V_0 d}{W} = 2f\delta \quad (12)$$

The above equation (11) corresponds to the conditions for obtaining the same dose as the dose for forming the groove G at the constant linear velocity $V_0$ in the example shown in FIGS. 2A to 2C or FIGS. 3A to 3C.

Therefore, when the linear velocity $V_0$ and the diameter d of the beam spot BS are previously determined, control (i.e., modulation) of the product $f \times \delta$ according to information to be carried on the walls OUT and IN allows changing the width of the groove G, that is, the positions of the walls OUT and IN in the radial direction, according to information to be carried on the groove G, while keeping the dose of electrons constant, and incidentally, f denotes a frequency for the scanning of the beam spot BS (hereinafter, the frequency is appropriately referred to as a wobble frequency), and $\delta$ denotes a step width in the X-direction. In other words, when the groove G is formed keeping the product $f \times \delta$ fixed, this makes a difference in the dose of electrons between wide and narrow portions of the groove G.

The above equation (12) indicates that the above-described modulation of the product $f \times \delta$ according to information to be carried on the walls OUT and IN is equivalent to modulation of the linear velocity $V_L$ of the optical disk DK according to the information.

Accordingly, modulating the width W of the groove G according to information to be carried on the groove G, while keeping the dose of electrons constant can be accomplished by changing the wobble frequency f or the step width $\delta$ in inverse proportion to the width W. Consequently, a change in either of the wobble frequency f and the step width $\delta$ can be accomplished by controlling the linear velocity $V_L$ of the optical disk DK in itself. In actual fact, if low frequency components of a signal corresponding to information to be recorded through changes in the positions of the walls OUT and IN in the radial direction are small in magnitude, the position of the beam spot BS in the X-direction is controlled as shown in FIG. 2C or 3C by using the above-mentioned linear velocity $V_L$ as its average value and keeping the linear velocity $V_L$ constant, and thus, this control can obtain the result equivalent to the result of the above-described control of the linear velocity $V_L$.

Next, the specific description is given with regard to a method of changing the position of the beam spot BS, while keeping the dose of electrons constant as well as overlapping one scanning locus with another scanning locus, as mentioned above.

(a) A method of changing by controlling the wobble frequency f

Figure 4:
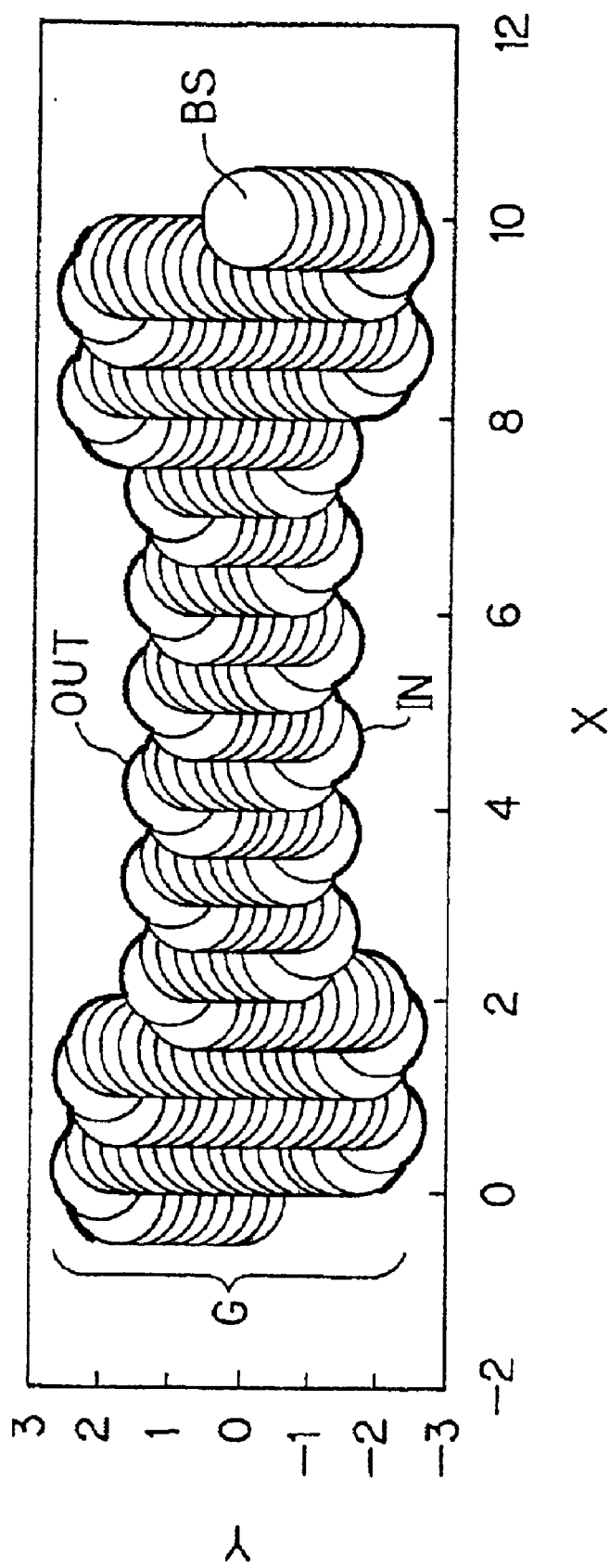
FIG. 4 is an illustration (III) explaining the principle of the first method.
Figure 5:
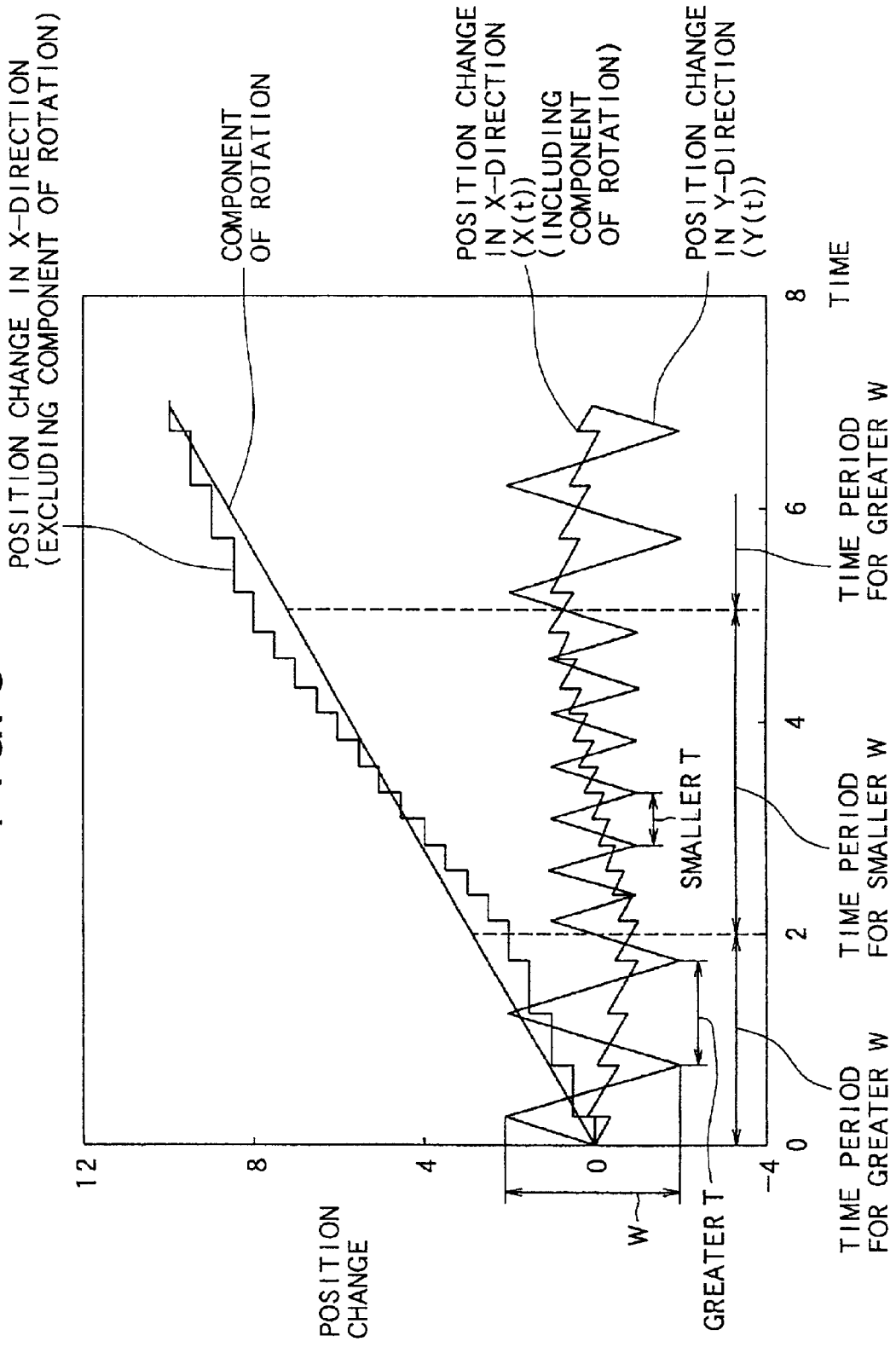
FIG. 5 is a graph (IV) explaining the principle of the first method.

Firstly, the description is given with reference to FIGS. 4 and 5 with regard to a method of changing the product $f \times \delta$ by controlling the above-mentioned wobble frequency f according to information to be carried on the groove G.

FIG. 4 shows a change in the position of the beam spot BS, which takes place during the formation of the groove G, provided that the linear velocity $V_{Y'}$ of the movement of the beam spot BS in the Y-direction and the number N $(=d/\delta)$ of overwrite operations are fixed and that the wobble frequency f is changed in inverse proportion to the width W of the groove G to be formed. Each of circles shown in FIG. 4 shows the position of the beam spot BS in a given time.

As is apparent from FIG. 4, the linear velocity $V_Y$, in the Y-direction is fixed, and therefore the range of overlapping of the beam spots BS is always fixed at every timing, so that the dose of electrons is fixed in an area to be formed into the groove G. Envelopes of the circles shown in FIG. 4 (shown by thick solid lines in FIG. 4) are to form the walls OUT and IN.

Next, the description is given with reference to FIG. 5 with regard to a change in the position of the beam spot on the optical disk DK, which takes place during the formation of the groove G in the optical disk DK in an example shown in FIG. 4.

In the example shown in FIG. 4, the relation among the change in the position of the beam spot BS on the optical disk DK in the X-direction shown in FIG. 4 under the assumption that the optical disk DK does not rotate, the component of rotation of the optical disk DK in itself, the change in the position of the beam spot BS on the optical disk DK in the Y-direction (which exhibits the same change in position whether or not allowance is made for the rotation of the optical disk DK, as in the case of the above-described example shown in FIGS. 2A to 2C or FIGS. 3A to 3C), and the change in the position of the beam spot BS on the optical disk DK in the X-direction after allowing for the rotation of the optical disk DK is as shown in FIG. 5. In this case, a triangular waveform showing the change in position in the Y-direction changes in the following manner. Since the linear velocity $V_Y$, is always fixed (in other words, the slope of the triangular waveform is always fixed), the amplitude of the triangular waveform becomes greater and the wobble frequency f thereof becomes lower in a time period in which the groove G must be formed with a greater width W, whereas the amplitude of the triangular waveform becomes smaller and the wobble frequency f thereof becomes higher in a time period in which the groove G must be formed with a smaller width W.

The change in position in the X-direction, after allowing for the component of rotation of the optical disk DK, assumes a ramp waveform, as in the case of the example shown in FIGS. 2A to 2C or FIGS. 3A to 3C. In this case, the linear velocity in the X-direction becomes higher in the time period in which the groove G must be formed with a greater width W, whereas the linear velocity in the X-direction becomes lower in the time period in which the groove G must be formed with a smaller width W. Thus, the change in position in the X-direction, after allowing for the rotation of the optical disk DK, is assumed to be obtained by subtraction of the component of rotation from the change in position in the X-direction after making no allowance for the above-mentioned component of rotation of the optical disk DK. Thus, similarly, the linear velocity in the X-direction becomes higher in the time period in which the groove G must be formed with a greater width W, whereas the linear velocity in the X-direction becomes lower in the time period in which the groove G must be formed with a smaller width W.

A signal corresponding to the change in position in the X-direction after allowing for the component of rotation of the optical disk DK, shown in FIG. 5 is used as a time-varying signal which controls the position of the beam spot BS in the X-direction (hereinafter, the signal is referred to as a position control signal X(t)), and a signal corresponding to the change in position in the Y-direction shown in FIG. 5 is used as a time-varying signal which controls the position of the beam spot BS in the Y-direction (hereinafter, the signal is referred to as a position control signal Y(t)). These position control signals X(t) and Y(t) are used to control the position to be irradiated with the beam spot BS, and thus, the position of the beam spot BS is controlled so that the groove G can be formed as shown in FIG. 4.

(b) A method of changing by controlling the step width δ

Figure 6:
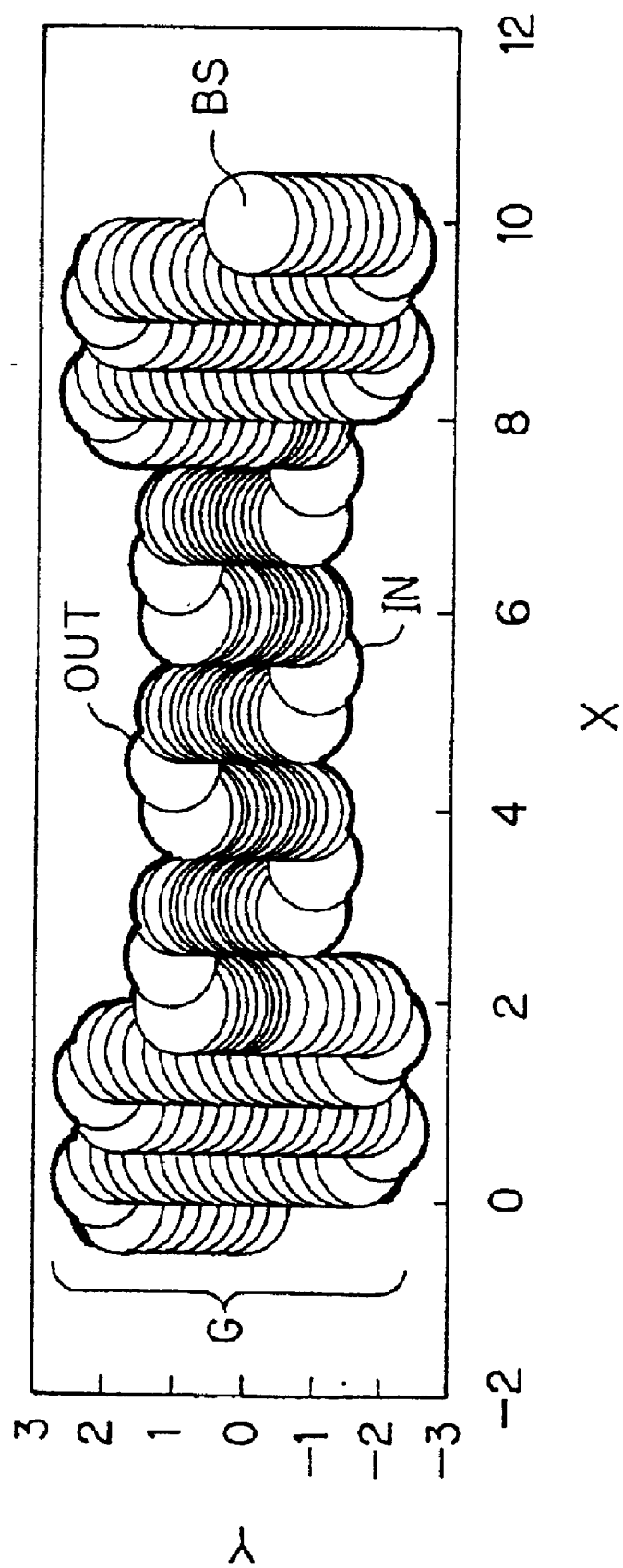
FIG. 6 is an illustration (V) explaining the principle of the first method.
Figure 7:
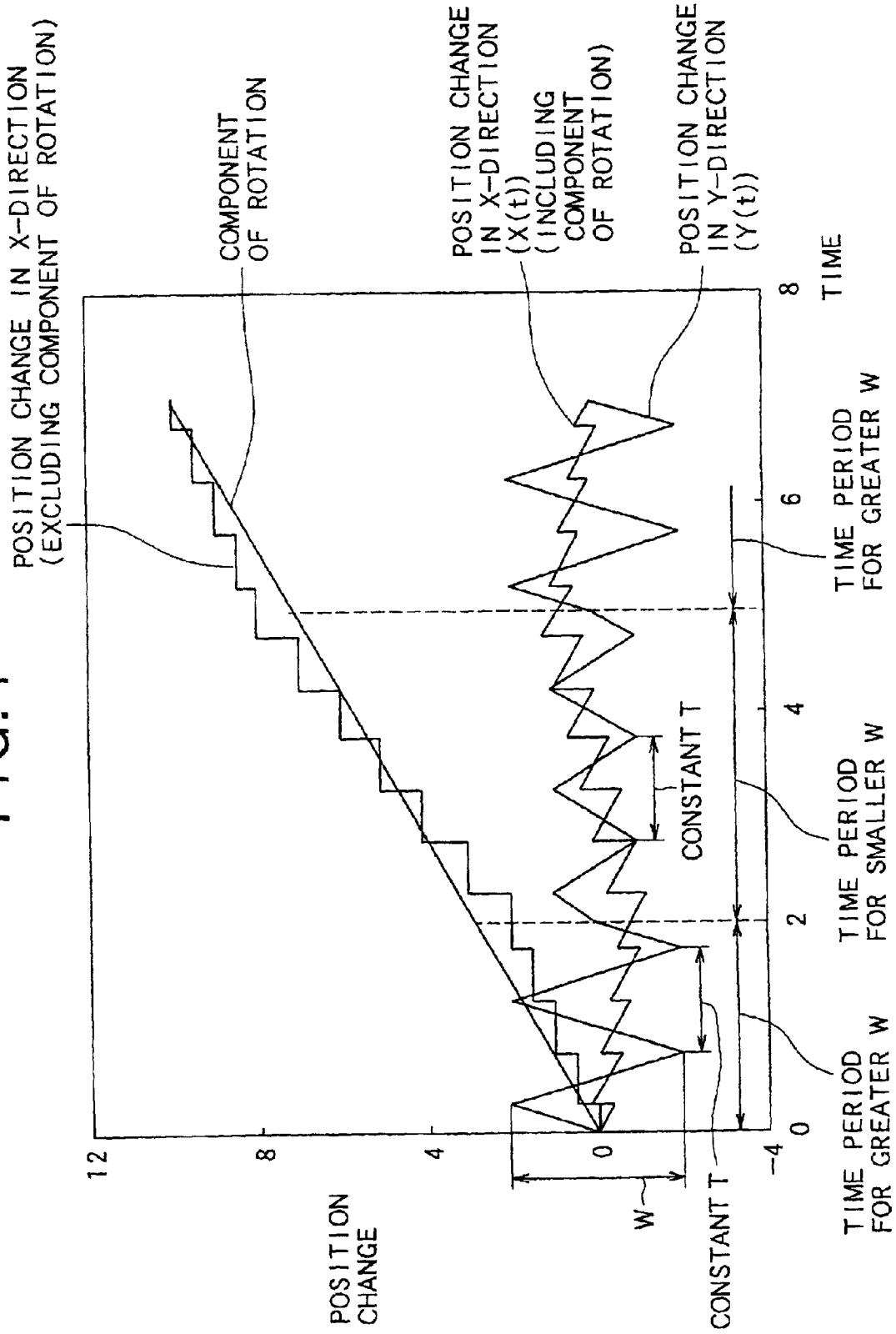
FIG. 7 is a graph (VI) explaining the principle of the first method.

Next, the description is given with reference to FIGS. 6 and 7 with regard to a method of changing the product f×δ by controlling the above-mentioned step width δ according to information to be carried on the groove G.

FIG. 6 shows a change in the position of the beam spot BS, which takes place during the formation of the groove G, provided that the wobble frequency f is fixed and that the linear velocity $V_Y$, of the movement of the beam spot BS in the Y-direction and the step width δ are changed in inverse proportion to the width W of the groove G to be formed. Each of circles shown in FIG. 6 shows the position of the beam spot BS in a given time.

As is apparent from FIG. 6, the wobble frequency f is fixed, and therefore the range of overlapping of the beam spots BS must be changed at every timing according to the width W of the groove G to be formed in order that the dose of electrons may be fixed in an area to be formed into the groove G. Envelopes of the circles shown in FIG. 6 (shown by thick solid lines in FIG. 6) are to form the walls OUT and IN.

Next, the description is given with reference to FIG. 7 with regard to a change in the position of the beam spot on the optical disk DK, which takes place during the formation of the groove G in the optical disk DK in an example shown in FIG. 6.

In the example shown in FIG. 6, the relation among the change in the position of the beam spot BS on the optical disk DK in the X-direction shown in FIG. 6 under the assumption that the optical disk DK does not rotate, the component of rotation of the optical disk DK in itself, the change in the position of the beam spot BS on the optical disk DK in the Y-direction (which exhibits the same change in position whether or not allowance is made for the rotation of the optical disk DK, as in the case of the above-described example shown in FIGS. 2A to 2C or FIGS. 3A to 3C), and the change in the position of the beam spot BS on the optical disk DK in the X-direction after allowing for the rotation of the optical disk DK is as shown in FIG. 7. In this case, a triangular waveform showing the change in position in the Y-direction changes in the following manner. Since the wobble frequency f is fixed (in other words, the cycle T of the triangular waveform is also fixed), the linear velocity $V_Y$, in the Y-direction must become lower in the time period in which the groove G must be formed with a smaller width W (in other words, the slope of the triangular waveform must become gentler in the time period in which the groove G must be formed with a smaller width W). Therefore, the range of overlapping of scans must become wider (in other words, the step width δ must become smaller) in the time period in which the groove G must be formed with a greater width W, whereas the range of overlapping of scans must become narrower (in other words, the step width δ must become greater) in the time period in which the groove G must be formed with a smaller width W.

The change in position in the X-direction, after allowing for the component of rotation of the optical disk DK, assumes a ramp waveform, as in the case of the example shown in FIGS. 2A to 2C or FIGS. 3A to 3C.

In this case, the linear velocity in the X-direction becomes lower in the time period in which the groove G must be formed with a greater width W, whereas the linear velocity in the X-direction becomes higher in the time period in which the groove G must be formed with a smaller width W. Thus, the change in position in the X-direction, after allowing for the rotation of the optical disk DK, is assumed to be obtained by subtraction of the component of rotation from the change in position in the X-direction after making no allowance for the above-mentioned component of rotation of the optical disk DK. Thus, similarly, the linear velocity in the X-direction becomes lower in the time period in which the groove G must be formed with a greater width W, whereas the linear velocity in the X-direction becomes higher in the time period in which the groove G must be formed with a smaller width W.

A signal corresponding to the change in position in the X-direction after allowing for the component of rotation of the optical disk DK, shown in FIG. 7 is used as the position control signal X(t), and a signal corresponding to the change in position in the Y-direction shown in FIG. 7 is used as the position control signal Y(t). These position control signals X(t) and Y(t) are used to control the position to be irradiated with the beam spot BS, and thus, the position of the beam spot BS is controlled so that the groove G can be formed as shown in FIG. 6.

(B) The principle of the second method

Figure 8:
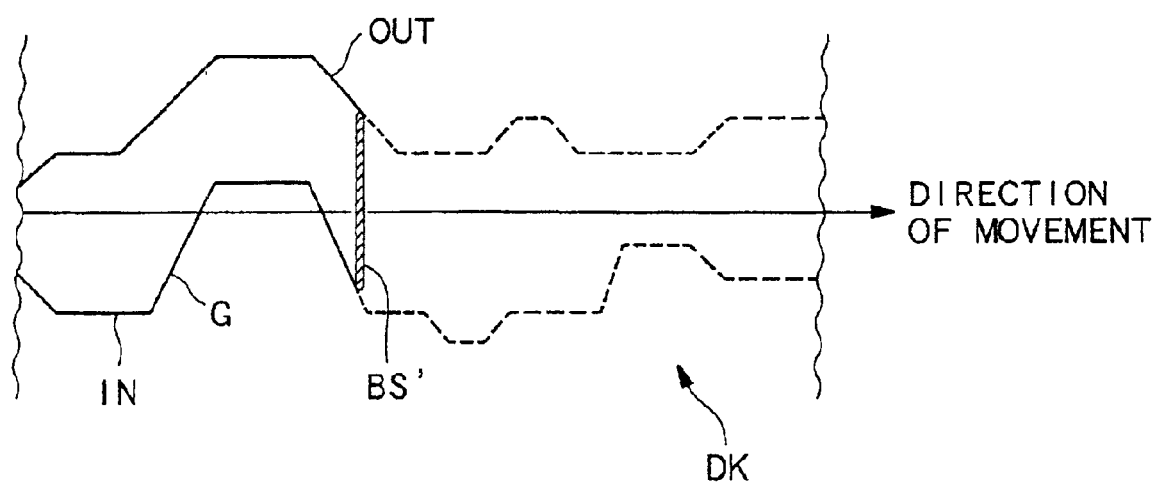
FIG. 8 is a top view explaining the principle of a second method.

Next, the description is given with regard to the principle of the second method with reference to FIG. 8.

FIG. 8 is a top view of the optical disk DK in which the groove G is formed by using the second method.

As described above, the second method is the method of forming the groove G by shifting the position to be irradiated with the electron beam while changing the shape in itself of the beam spot which appears on the optical disk DK through irradiation with the electron beam.

More specifically, as shown in FIG. 8, in the second method, the width control signal W(t) and the position control signal D(t) described with reference to FIGS. 1A and 1B are used to directly control the overall width of a beam spot BS' and control the position to be irradiated with the electron beam on the optical disk DK, respectively, and simultaneously, the optical disk DK is rotated.

Thus, the groove G is formed by simultaneously forming the walls OUT and IN with the movement of the beam spot BS'. Accordingly, the second method does not perform a scan of the beam spot BS' between the walls OUT and IN, as distinct from the above-described first method (see FIG. 4 or 6).

(II) First embodiment

Next, the first embodiment of the present invention corresponding to the above-described first method will be described with reference to FIGS. 9 to 11.

Figure 9:
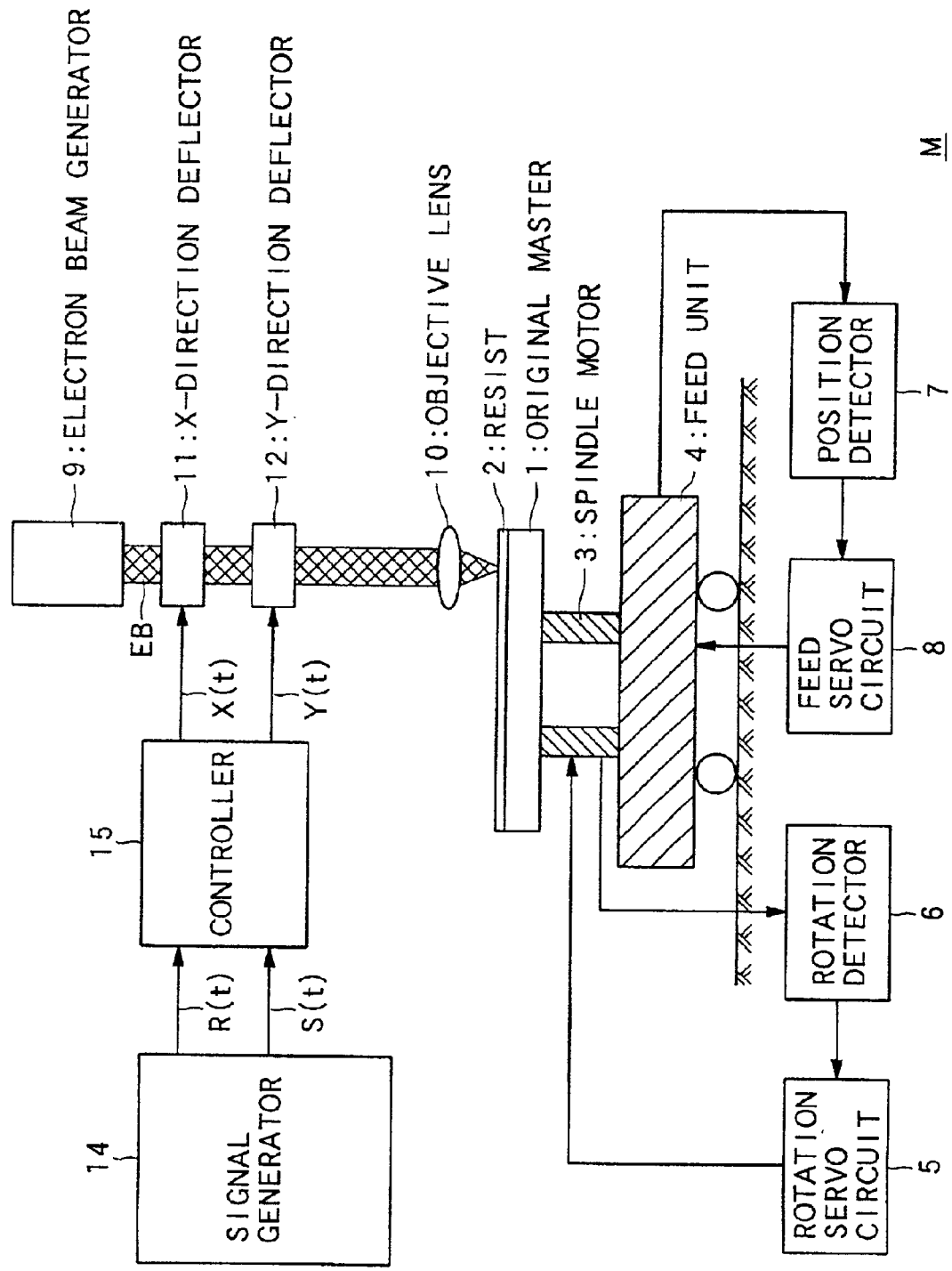
FIG. 9 is a block diagram showing a general configuration of a disk manufacturing apparatus of a first embodiment.

FIG. 9 is a block diagram showing a general configuration of a disk manufacturing apparatus according to the first embodiment. FIGS. 10 and 11 are block diagrams showing the detailed configuration thereof.

The disk manufacturing apparatus shown in FIG. 9 is a disk manufacturing apparatus for manufacturing a stamper disk, which is used to mass-manufacture optical disks for recording, each of which has the above-mentioned groove G, for market.

As shown in FIG. 9, a disk manufacturing apparatus M of the first embodiment is provided with: an original master 1 which is made of glass, silicon or the like and whose surface is coated with a resist 2 to be exposed to light; a spindle motor 3; a feed unit 4; a rotation servo circuit 5; a rotation detector 6; a position detector 7; a feed servo circuit 8; an electron beam generator 9 which functions as an emitting device; an objective lens which functions as a focusing device; an X-direction deflector 11 which functions as a controlling device; a Y-direction deflector 12 which functions as a controlling device; a signal generator 14; and a controller 15.

The original master 1 coated with the resist 2 corresponds to the above-mentioned optical disk DK.

Next, a general operation will be described.

First, an electron beam EB generated by the electron beam generator 9 which is a high-power electron beam generator is deflected in both the X-direction and the Y-direction by the X-direction deflector 12 and the Y-direction deflector 12 in accordance with the above-described position control signals X(t) and Y(t) outputted from the controller 15, and then, the electron beam EB is supplied to the objective lens 10.

Then, the objective lens 10 focuses the supplied electron beam EB on the resist 2 at a position at which the groove G is to be formed.

The original master 1 is fixed on the spindle motor 3, and the spindle motor 3 rotates at a preset linear velocity under control of the rotation detector 6 for detecting a speed of rotation of the spindle motor 3 and the rotation servo circuit 5 for servo-controlling the detected speed of rotation.

Furthermore, the original master 1 can be moved in its radial direction by the feed unit 4, and the original master 1 is fed at a preset feed speed in the radial direction under control of the position detector 7 for detecting the position of the moving original master 1 in the radial direction and the feed servo circuit 8 for servo-controlling the position thereof.

Under the rotation control of the rotation servo circuit 5 and the feed control of the feed servo circuit 8, the groove G is then formed (cut) in the resist 2 of the original master 1 in a spiral fashion from the center of the original master 1 to the outer periphery thereof.

On the other hand, the signal generator 14 generates the above-mentioned wall position control signals R(t) and S(t) separately according to information to be carried on the groove G, and then outputs the signals R(t) and S(t) to the controller 15.

Then, the controller 15 operates as described later to generate the above-described position control signals X(t) and Y(t) according to the outputted wall position control signals R(t) and S(t), and then supplies the signals X(t) and Y(t) to the X-direction deflector 12 and the Y-direction deflector 12, respectively.

Next, the detailed configuration and operation of the controller 15 will be described with reference to FIG. 10.

Figure 10:
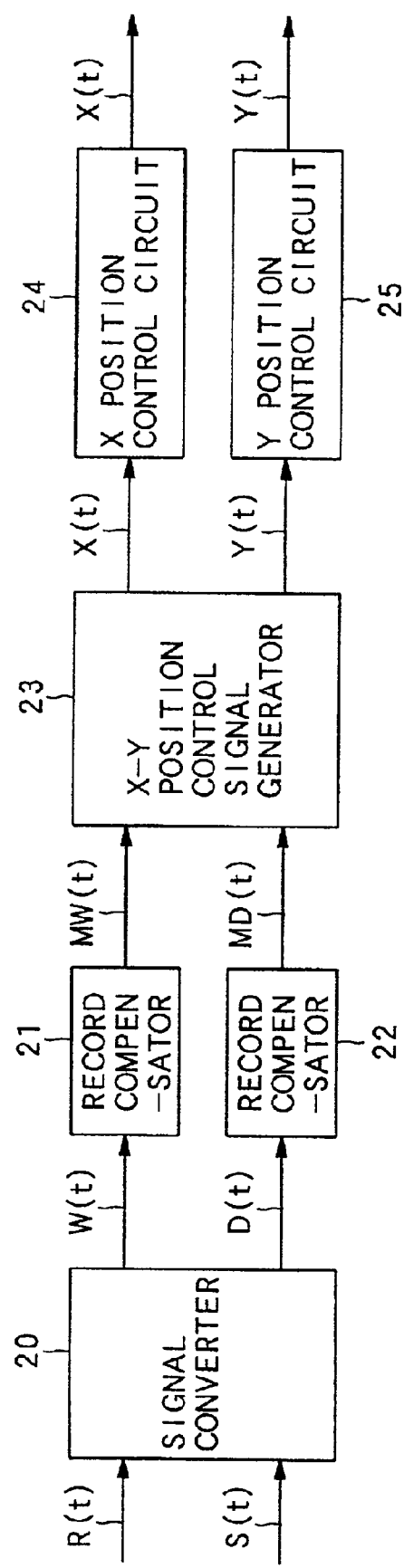
FIG. 10 is a block diagram (I) showing the detailed configuration of the disk manufacturing apparatus of the first embodiment.

FIG. 10 is a block diagram showing the detailed configuration of the controller 15.

As shown in FIG. 10, the controller 15 which generates the position control signals X(t) and Y(t) according to the wall position control signals R(t) and S(t) is provided with: a signal converter 20; record compensators 21 and 22; an X-Y position control signal generator 23; an X position control circuit 24; and a Y position control circuit 25.

Next, the operation will be described.

First, the signal converter 20 generates the above-described width control signal W(t) and position control signal D(t) according to the wall position control signals R(t) and S(t) in conformity with the above equations (1) and (2), respectively, and then outputs the signals W(t) and D(t) to the record compensators 21 and 22, respectively.

Then, the record compensators 21 and 22 perform compensation on the width control signal W(t) and the position control signal D(t), respectively, in order to compensate for signal deterioration or the like which occurs when information is recorded on the resist 2 and when information is recorded on the optical disk manufactured from the original master 1, thereby generating a compensated width control signal MW(t) and a compensated position control signal MD(t), respectively, and then output the signals MW(t) and MD(t) to the X-Y position control signal generator 23.

Then, the X-Y position control signal generator 23 having the detailed configuration to be described later generates the above-mentioned position control signals X(t) and Y(t) according to the compensated width control signal MW(t) and the compensated position control signal MD(t), respectively, upon the above-described series of principles, and then outputs the signals X(t) and Y(t) to the X position control circuit 24 and the Y position control circuit 25, respectively.

Finally, the X position control circuit 24 and the Y position control circuit 25 perform preset waveform shaping or the like on the position control signals X(t) and Y(t), respectively, and then output the waveform-shaped signals X(t) and Y(t) to the X-direction deflector 12 and the Y-direction deflector 12, respectively.

Next, the detailed configuration and operation of the above-mentioned X-Y position control signal generator 23 will be described with reference to FIGS. 11 and 12.

Figure 11:
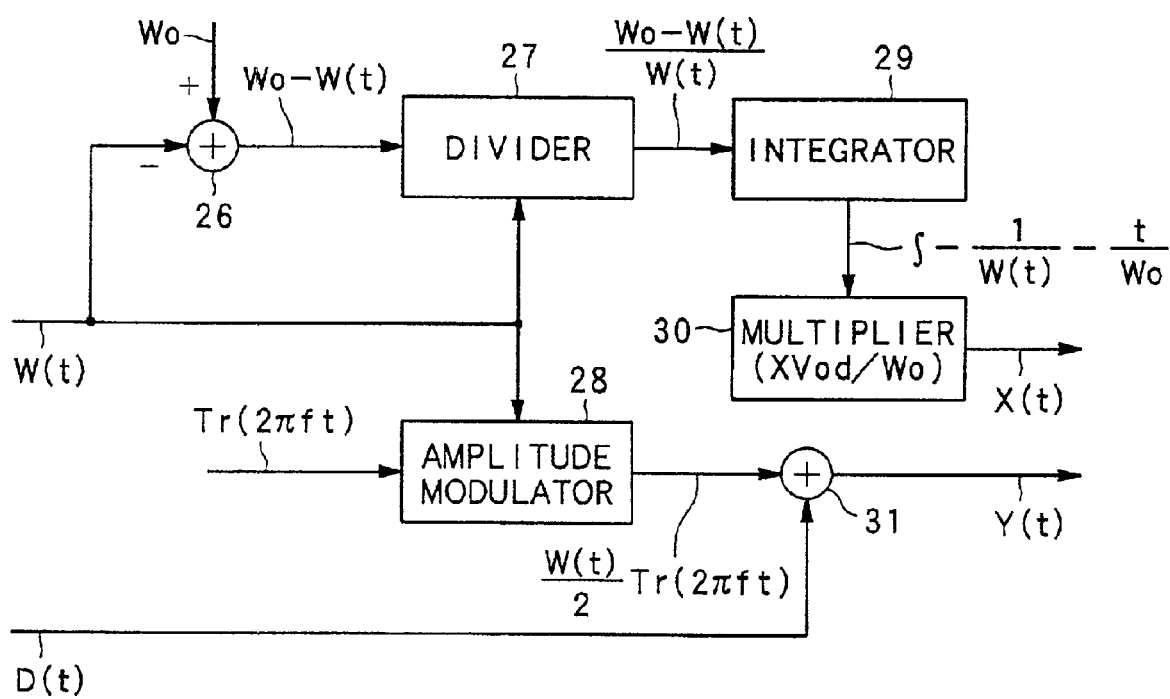
FIG. 11 is a block diagram (II) showing the detailed configuration of the disk manufacturing apparatus of the first embodiment.
Figure 12:
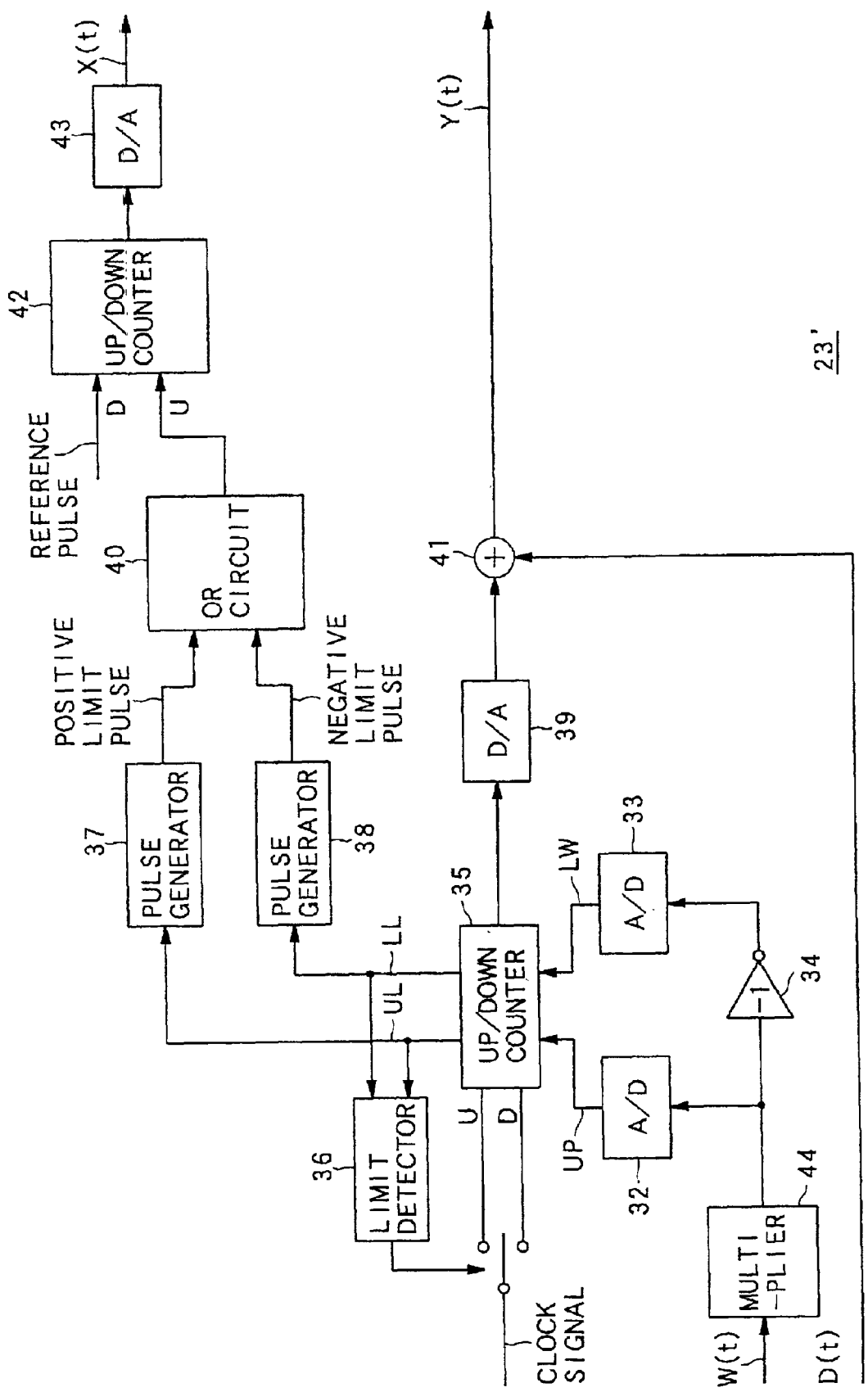
FIG. 12 is a block diagram (III) showing the detailed configuration of the disk manufacturing apparatus of the first embodiment.

FIG. 11 is a block diagram showing the detailed configuration of the X-Y position control signal generator 23 which generates the position control signals X,(t) and Y(t) upon the above-described principle of the method of forming the groove G by controlling the step width $\delta$. FIG. 12 is a block diagram showing the detailed configuration of the X-Y position control signal generator 23 which generates the position control signals X(t) and Y(t) upon the above-described principle of the method of forming the groove G by controlling the wobble frequency f.

Prior to the specific description of the configuration of the X-Y position control signal generator 23, the description is first given with regard to the process of generating the position control signals X(t) and Y(t) according to the compensated width control signal MW(t) (which is substantially identical with the width control signal W(t)) and the compensated position control signal MD(t) (which is substantially identical with the position control signal D(t)), respectively, upon the above-described principle of the method of forming the groove G by controlling the step width $\delta$.

First, the X-Y position control signal generator 23 calculates the position control signal Y(t) and a linear velocity $V_L(t)$ in the X-direction (i.e., of the rotation of the optical disk DK) from the width control signal W(t) which serves as a function of time, by the following equations (13) and (14) based on the above equations (11) and (12), respectively.

More specifically, the position control signal Y(t) is given by the following equation (13):

$$Y(t)=(W(t)/2)Tr(2\pi ft)+D(t) \tag{13}$$

where $Tr(2\pi ft)$ denotes a triangular wave having a unit amplitude at the frequency f.

The above equation (12) leads to the following equation (14).

$$V_L(t)=V_0d/W(t) \tag{14}$$

A reference average linear velocity $V_{REF}$ of the optical disk DK, which makes the value of the width control signal W(t) equal to the average width $W_0$ of the groove G, is expressed by the following equation (15).

$$V_{REF}=V_0d/W_0 \tag{15}$$

The linear velocity $V_L(t)$ is equal to the sum of a differential value of the position control signal X(t), that is, a velocity V(t) of movement of the beam spot BS in the X-direction after allowing for the linear velocity $V_L(t)$ of the optical disk DK, and the reference average linear velocity $V_{REF}$, and therefore the linear velocity $V_L(t)$ is expressed by the following equation (16).

$$V_L(t)=V_{REF}+V(t) \tag{16}$$

Accordingly, this leads to the following equation (17).

$$X(t) = \int V(t)dt = \int (V_L(t) - V_{REF})dt \tag{17}$$
$$= \int \left(\frac{V_0d}{W(t)} - \frac{V_0d}{W_0}\right)dt = V_0d \int \left(\frac{1}{W(t)} - \frac{1}{W_0}\right)dt$$
$$= \frac{V_0d}{W_0} \int \frac{W_0 - W(t)}{W(t)}dt = V_0d\left(\int -\frac{1}{W(t)}dt - \frac{t}{W_0}\right)$$

Accordingly, the X-Y position control signal generator 23 can have such a configuration as may implement the above equations (13) and (17). More specifically, the X-Y position control signal generator 23 can have a circuit configuration which is provided with an adder 26, a divider 27, an amplitude modulator 28, an integrator 29, a multiplier 30 and an adder 31 so as to use the externally supplied triangular wave signal $Tr(2\pi ft)$, as shown in FIG. 11.

Next, the description is given with regard to the configuration of an X-Y position control signal generator 23' which generates the position control signals X(t) and Y(t) according to the width control signal W(t) and the position control signal D(t), respectively, upon the above-described principle of the method of forming the groove G by controlling the wobble frequency f.

In this case, there are various approaches for configuring the X-Y position control signal generator 23'. For example, the X-Y position control signal generator 23' can be provided with a multiplier 44, A/D (analog-to-digital) converters 32 and 33, an inverter 34, up/down counters 35 and 42, a limit detector 36, pulse generators 37 and 38, D/A (digital-to-analog) converters 39 and 43, an OR circuit 40 and an adder 41 as shown in FIG. 12, upon the principle described above with reference to FIGS. 4 and 5.

The multiplier 44 multiplies the width control signal W(t) by ½. The A/D converters 32 and 33 output an upper limit value signal UP indicative of an upper limit value of the up/down counter 35 and a lower limit value signal LW indicative of a lower limit value of the up/down counter 35, respectively, to the up/down counter 35.

Then, the up/down counter 35 generates an upper limit signal UL indicative of the timing at which the count reaches the upper limit value and a lower limit signal LL indicative of the timing at which the count reaches the lower limit value in accordance with the upper limit value signal UP and the lower limit value signal LW, respectively.

Thus, the limit detector 36 switches a clock signal to be inputted to the up/down counter 35 to a down input D at the timing at which the upper limit signal UL is inputted to the limit detector 36, and switches the clock signal to an up input U at the timing at which the lower limit signal LL is inputted to the limit detector 36.

The pulse generators 37 and 38 generate a positive limit pulse and a negative limit pulse in accordance with the upper limit signal UL and the lower limit signal LL, respectively. The respective timings of the positive limit pulse and the negative limit pulse are as follows: the positive limit pulse enters "HIGH" level at the same timing as the timing of an upper peak of the position control signal Y(t) shown in FIG. 5, and the negative limit pulse enters "HIGH" level at the same timing as the timing of a lower peak of the position control signal Y(t).

An output signal from the OR circuit 40 is inputted to an up input U of the up/down counter 42, and a reference pulse corresponding to the above-mentioned reference average linear velocity $V_{REF}$ is inputted to a down input D of the up/down counter 42.

Then, an output signal from the up/down counter 42 is converted into an analog signal, which is then used as the above-mentioned position control signal X(t, and an output signal from the adder 41 is used as the position control signal Y(t) as it is.

(III) Second embodiment

Next, the second embodiment of the present invention corresponding to the above-described second method will be described with reference to FIGS. 13 and 14.

Figure 13:
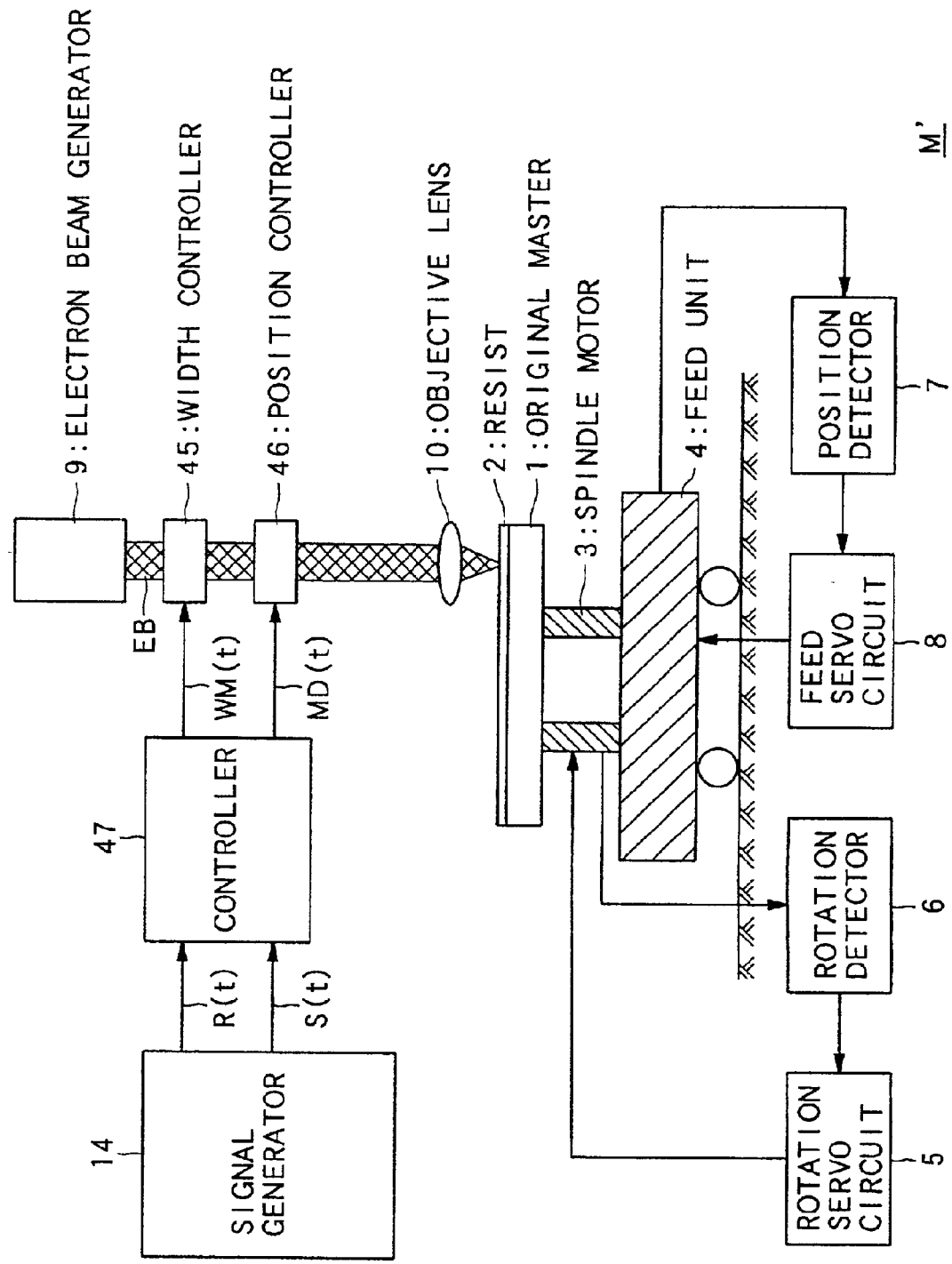
FIG. 13 is a block diagram showing a general configuration of a disk manufacturing apparatus of a second embodiment.

FIG. 13 is a block diagram showing a general configuration of a disk manufacturing apparatus according to the second embodiment. FIG. 14 is a block diagram showing the detailed configuration thereof.

The disk manufacturing apparatus shown in FIG. 13 is a disk manufacturing apparatus for manufacturing the stamper disk, which is used to mass-manufacture optical disks for recording, each of which has the above-mentioned groove G, for -market. In FIG. 13, the same members as the members of the disk manufacturing apparatus M of the first embodiment shown in FIG. 9 are indicated by the same reference numerals, and the detailed description of the same members is omitted.

As shown in FIG. 13, a disk manufacturing apparatus M' of the second embodiment is provided with a width controller 45 which controls the width of the beam spot BS in the Y-direction in accordance with the above-mentioned width control signal W(t), and a position controller 46 which controls the position to be irradiated with the beam spot BS in the Y-direction in accordance with the above-mentioned position control signal D(t), instead of the X-direction deflector 12 and the Y-direction deflector 12 of the disk manufacturing apparatus M of the first embodiment.

Moreover, a controller 47 which functions as a moving device replaces the controller 15 of the disk manufacturing apparatus M of the first embodiment. The controller 47 operates as described later to generate the above-described compensated width control signal MW(t) and compensated position control signal MD(t) according to the above-described wall position control signals R(t) and S(t), and then supplies the signals MW(t) and MD(t) to the width controller 45 and the position controller 46, respectively.

Then, the width controller 45 controls the width of the beam spot BS in itself in the Y-direction according to the compensated width control signal MW(t), and the position controller 46 controls the position to be irradiated with the beam spot BS in the Y-direction according to the compensated position control signal MD(t). Thus, the groove G is formed in the resist 2 upon the principle described with reference to FIG. 8.

Next, the detailed configuration and operation of the controller 47 will be described with reference to FIG. 14.

Figure 14:
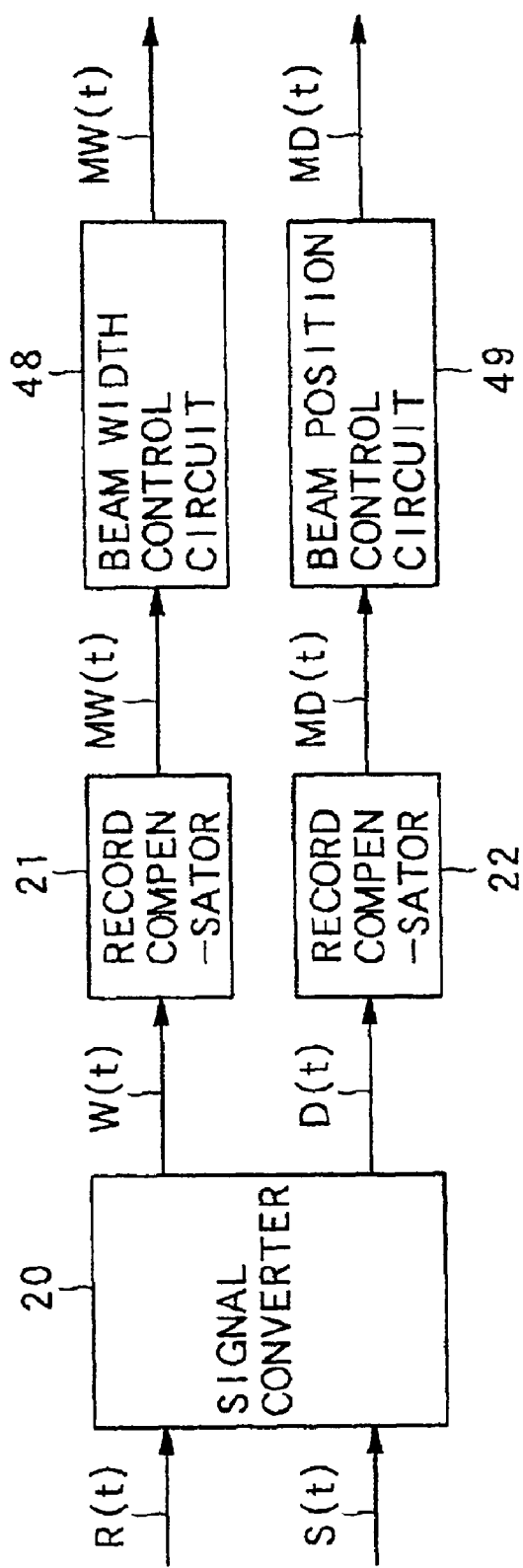
FIG. 14 is a block diagram showing the detailed configuration of the disk manufacturing apparatus of the second embodiment.

FIG. 14 is a block diagram showing the detailed configuration of the controller 47. In FIG. 14, the same members as the members of the controller 15 shown in FIG. 10 are indicated by the same reference numerals, and the detailed description of the same members is omitted.

As shown in FIG. 14, the controller 47 which generates the compensated width control signal MW(t) and the compensated position control signal MD(t) according to the wall position control signals R(t) and S(t) is provided with: the signal converter 20; and the record compensators 21 and 22 as in the case of the first embodiment; a beam width control circuit 48; and a beam position control circuit 49.

Next, the operation will be described.

First, the signal converter 20 and the record compensators 21 and 22 operate in the same manner as the circuits 20, 21 and 22 of the above-described first embodiment, thereby generating the compensated width control signal MW(t) and the compensated position control signal MD(t) according to the wall position control signals R(t) and S(t).

Then, the beam width control circuit 48 performs preset waveform shaping or the like on the compensated width control signal MW(t), and then outputs the waveform-shaped signal MW(t) to the above-mentioned width controller 45.

On the other hand, the beam position control circuit 49 performs preset waveform shaping or the like on the compensated position control signal MD(t), and then outputs the waveform-shaped signal MD(t) to the above-mentioned position controller 46.

As described above, according to the disk manufacturing apparatus M or M' of the first or second embodiment, the focusing device focuses the electron beam EB on the optical disk DK to form the beam spot BS, and the controlling device controls the beam spot BS so that the beam spot BS is focused in position on the optical disk DK, thereby forming the groove G in the optical disk DK. Accordingly, the disk manufacturing apparatus M or M' can form the groove G at higher density with higher precision, as compared to a conventional apparatus which uses a laser beam to form a groove.

In the case of the first method of forming the groove G by controlling the wobble frequency f, the focusing device uses one electron beam EB to form the beam spot BS, and the moving device moves the beam spot BS at a fixed velocity of movement of the beam spot BS relative to the optical disk DK in accordance with the width control signal W(t) and the position control signal D(t) so as to scan the beam spot BS on the optical disk DK in an area to be formed into the groove G. Accordingly, this method can form the groove G at still higher density with higher precision.

In the case of the first method of forming the groove G by controlling the step width δ, the focusing device uses one electron beam EB to form the beam spot BS, and the moving device moves the beam spot BS at a variable velocity of movement of the beam spot BS relative to the optical disk DK at a fixed wobble frequency f on the optical disk DK in accordance with the width control signal W(t) and the position control signal D(t) so as to scan the beam spot BS on the optical disk DK in an area to be formed into the groove G. Accordingly, this method can form the groove G at still higher density with higher precision.

In the case of the first method, the moving device moves the beam spot BS so that a scanning locus of one immediately preceding scan of the beam spot BS overlaps a scanning locus of the current scan of the beam spot BS in the direction of the groove G. Accordingly, the surfaces of the walls of the groove G can be more smoothly formed.

In the case of the second method, the focusing device uses one electron beam EB to form the beam spot BS, and the moving device controls the beam spot BS so that the beam spot BS moves on the optical disk DK in an area to be formed into the groove G, while controlling the shape of the beam spot BS in accordance the width control signal W(t) and the position control signal D(t). Accordingly, the disk manufacturing apparatus M or M' having a simple configuration can form the groove G at higher density with higher precision, as compared to a conventional apparatus which uses a laser beam to form a groove.

The width control signal W(t) and the position control signal D(t) change according to information to be carried on the groove G through changes in the shapes of the walls. Accordingly, the groove G can be formed at higher density with higher precision with information carried on the groove G.

An optical disk to be applied to the present invention is not limited to the recordable optical disk DK of the above-described embodiments but may be a read-only optical disk (that is, a ROM (read only memory) type optical disk).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-102214 filed on Mar. 30, 2001 including the specification, claims, drawings and summary is incorporated herein by reference in its entirety.

What is claimed is:

1. A grooving apparatus for forming a groove to function as an information track in an information recording medium comprising:
    an emitting device which emits an electron beam;
    a focusing device which focuses the emitted electron beam on a fixed range smaller than the size of the groove on the information recording medium; and
    a controlling device which controls the electron beam so that the electron beam is focused in position on the information recording medium to form the groove in the information recording medium,
    wherein the focusing device uses one emitted electron beam to form one beam spot of a fixed size on the information recording medium in a smaller range than the size of the groove, and
    the controlling device includes a moving device which moves the beam spot at a fixed velocity of movement of the beam spot relative to the information recording medium in accordance with two shape signals indicative of the respective shapes of two walls of the groove so as to scan the beam spot on the information recording medium in an area to be formed into the groove.

2. The grooving apparatus according to claim 1, wherein the moving device moves the beam spot so that a scanning locus of one immediately preceding scan of the beam spot overlaps a scanning locus of the current scan of the beam spot in the direction of the groove.

3. The grooving apparatus according to claim 1, wherein the shape signals change according to information to be carried on the groove through changes in the shapes of the walls.

4. A grooving apparatus for forming a groove to function as an information track in an information recording medium comprising:
    an emitting device which emits an electron beam;
    a focusing device which focuses the emitted electron beam on a fixed range smaller than the size of the groove on the information recording medium; and
    a controlling device which controls the electron beam so that the electron beam is focused in position on the information recording medium to form the groove in the information recording medium,
    wherein the focusing device uses one emitted electron beam to form one beam spot of a fixed size on the information recording medium in a smaller range than the size of the groove, and
    the controlling device includes a moving device which moves the beam spot at a fixed velocity of movement of the beam spot relative to the information recording medium in accordance with two shape signals indicative of the respective shapes of two walls of the groove so as to scan the beam spot on the information recording medium in an area to be formed into the groove.

5. The grooving apparatus according to claim 4, wherein the moving device moves the beam spot so that a scanning locus of one immediately preceding scan of the beam spot overlaps a scanning locus of the current scan of the beam spot in the direction of the groove.

6. A grooving apparatus for forming a groove to function as an information track in an information recording medium comprising:
    an emitting device which emits an electron beam;
    a focusing device which focuses the emitted electron beam on a fixed range smaller than the size of the groove on the information recording medium; and
    a controlling device which controls the electron beam so that the electron beam is focused in position on the information recording medium,
    wherein the focusing device uses one emitted electron beam to form one beam spot on the information recording medium in a smaller range than the size of the groove, and
    the controlling device includes a moving device which controls the beam spot so that the beam spot moves on the information recording medium in an area to be formed into the groove, while controlling the shape of the beam spot in accordance with two shape signals indicative of the respective shapes of two walls of the groove.

7. A grooving method for forming a groove to function as an information track in an information recording medium comprising:
    an emitting process of emitting an electron beam;
    a focusing process of focusing the emitted electron beam on a fixed range smaller than the size of the groove on the information recording medium; and
    a controlling process of controlling the electron beam so that the electron beam is focused in position on the information recording medium to form the groove in the information recording medium,
    wherein the focusing process uses one emitted electron beam to form one beam spot of a fixed size on the information recording medium in a smaller range than the size of the groove, and
    the controlling process includes a moving process of moving the beam spot at a fixed velocity of movement of the beam spot relative to the information recording medium in accordance with two shape signals indicative of the respective shapes of two walls of the groove so as to scan the beam spot on the information recording medium in an area to be formed into the groove.

8. The grooving method according to claim 7, wherein the moving process moves the beam spot so that a scanning locus of one immediately preceding scan of the beam spot overlaps a scanning locus of the current scan of the beam spot in the direction of the groove.

9. The grooving method according to claim 7, wherein the shape signals change according to information to be carried on the groove through changes in the shapes of the walls.

10. A grooving method for forming a groove to function as an information track in an information recording medium comprising:

an emitting process of emitting an electron beam;

a focusing process of focusing the emitted electron beam on a fixed range smaller than the size of the groove on the information recording medium; and a controlling process of controlling the electron beam so that the electron beam is focused in position on the information recording medium to form the groove in the information recording medium, wherein the focusing process uses one emitted electron beam to form one beam spot of a fixed size on the information recording medium in a smaller range than the size of the groove, and the controlling process includes a moving process of moving the beam spot at a variable velocity of movement of the beam spot relative to the information recording medium at a fixed frequency of movement of the beam spot on the information recording medium in accordance with two shape signals indicative of the respective shapes of two walls of the groove so as to scan the beam spot on the information recording medium in an area to be formed into the groove.

11. The grooving method according to claim 10, wherein the moving process moves the beam spot so that a scanning locus of one immediately preceding scan of the beam spot overlaps a scanning locus of the current scan of the beam spot in the direction of the groove.

12. A grooving method for forming a groove to function as an information track in an information recording medium comprising:

an emitting process of emitting an electron beam;

a focusing process of focusing the emitted electron beam on a fixed range smaller than the size of the groove on the information recording medium; and a controlling process of controlling the electron beam so that the electron beam is focused in position on the information recording medium to form the groove in the information recording medium, wherein the focusing process uses one emitted electron beam to form one beam spot on the information recording medium in a smaller range than the size of the groove, and the controlling process includes a moving process of controlling the beam spot so that the beam spot moves on the information recording medium in an area to be formed into the groove, while controlling the shape of the beam spot in accordance with two shape signals indicative of the respective shapes of two walls of the groove.

* * * * *

UNITED STATES PATENT AND TRADEMARK OFFICE
CERTIFICATE OF CORRECTION

PATENT NO. : 6,930,961 B2
DATED : August 16, 2005
INVENTOR(S) : Yasumitsu Wada

It is certified that error appears in the above-identified patent and that said Letters Patent is hereby corrected as shown below:

Column 20,
Line 10, delete "fixed" and insert -- variable --.
Line 12, after the word "medium" insert -- at a fixed frequency of movement of the beam spot on the information recording medium --.

Signed and Sealed this

Twenty-second Day of November, 2005

JON W. DUDAS
*Director of the United States Patent and Trademark Office*